(12) United States Patent
Pereira De Oliveira et al.

(10) Patent No.: US 11,193,465 B2
(45) Date of Patent: Dec. 7, 2021

(54) METHOD FOR MAXIMIZING THE FORMATION OF DEPOSITS IN INJECTOR NOZZLES OF GDI ENGINES

(71) Applicant: PETRÓLEO BRASILEIRO S.A.—PETROBRAS, Rio de Janeiro (BR)

(72) Inventors: Paulo Cesar Pereira De Oliveira, Rio de Janeiro (BR); Guilherme Bastos Machado, Niterói (BR); Tadeu Cavalcante Cordeiro De Melo, Rio de Janeiro (BR); Marcelo Laurentys Airoldi, São Paulo (BR); Renata Nohra Chaar De Souza, Rio de Janeiro (BR); Flávio Gomes Dias, São Paulo (BR); Franck Yves Turkovics, Carapicuíba (BR); Pedro Artur Lira Da Silva, Rio de Janeiro (BR)

(73) Assignee: PETRÓLEO BRASIIEIRO S.A.—PETROBRAS, Rio de Janeiro (BR)

( * ) Notice: Subject to any disclaimer, the term of this patent is extended or adjusted under 35 U.S.C. 154(b) by 324 days.

(21) Appl. No.: 16/322,368

(22) PCT Filed: Jun. 28, 2017

(86) PCT No.: PCT/GB2017/051884
§ 371 (c)(1),
(2) Date: Jan. 31, 2019

(87) PCT Pub. No.: WO2018/002610
PCT Pub. Date: Jan. 4, 2018

(65) Prior Publication Data
US 2019/0195184 A1 Jun. 27, 2019

(30) Foreign Application Priority Data
Jun. 28, 2016 (BR) .................. 10 2016 015228 3

(51) Int. Cl.
*F02M 65/00* (2006.01)
*G01M 15/05* (2006.01)
*F02B 75/12* (2006.01)
*F02B 77/08* (2006.01)
*F02D 41/38* (2006.01)
*F02B 77/04* (2006.01)

(52) U.S. Cl.
CPC .......... *F02M 65/001* (2013.01); *F02B 75/12* (2013.01); *F02B 77/08* (2013.01); *F02M 65/00* (2013.01); *G01M 15/05* (2013.01); *F02B 77/04* (2013.01); *F02B 2075/125* (2013.01); *F02D 2041/389* (2013.01); *Y02T 10/12* (2013.01)

(58) Field of Classification Search
CPC ...... F02M 65/001; F02M 65/00; F02B 75/12; F02B 77/08; F02B 77/04; F02B 2075/125; G01M 15/05; Y02T 10/12; F02D 2041/389
See application file for complete search history.

(56) References Cited

U.S. PATENT DOCUMENTS

| | | | | |
|---|---|---|---|---|
| 6,746,495 | B2 * | 6/2004 | Avery ..................... | C10L 1/023 44/640 |
| 7,901,470 | B2 * | 3/2011 | Graupner ................ | C10L 1/143 44/412 |
| 8,668,749 | B2 * | 3/2014 | Fang ........................ | C10L 1/10 44/418 |
| 9,885,335 | B2 * | 2/2018 | Thompson .............. | F02P 17/02 |
| 10,190,493 | B2 * | 1/2019 | Hill ....................... | F02M 35/024 |
| 2002/0120171 | A1 * | 8/2002 | Avery ..................... | F02B 77/04 585/14 |
| 2005/0172545 | A1 * | 8/2005 | Graupner ................ | C10L 10/04 44/412 |
| 2012/0102826 | A1 * | 5/2012 | Fang ..................... | C07D 213/55 44/336 |
| 2017/0114716 | A1 * | 4/2017 | Hill ........................ | F02B 77/04 |
| 2020/0271070 | A1 * | 8/2020 | Aríztegui Cortijo ... | F02B 77/04 |

FOREIGN PATENT DOCUMENTS

| | | |
|---|---|---|
| FR | 2 981 451 A1 | 4/2013 |
| WO | 2005/040599 A1 | 5/2005 |
| WO | 2017/102891 A1 | 6/2017 |

OTHER PUBLICATIONS

International Search Report of PCT/GB2017/051884 dated Nov. 10, 2017 [PCT/ISA/210].

(Continued)

*Primary Examiner* — Freddie Kirkland, III
(74) *Attorney, Agent, or Firm* — Sughrue Mion, PLLC

(57) ABSTRACT

The invention relates to the technology of gasoline direct injection (GDI) in automotive engines. In this context, the invention provides a method for maximizing the formation of deposits in injector nozzles of GDI engines, said method including at least one test cycle, each test cycle including at least one testing step in which a predetermined condition of speed and load of the GDI engine is maintained for a specified period of time, wherein, in said cycle, in at least one testing step, the engine speed is maintained between 1300 and 3700 rpm, the engine load is maintained between 10 and 80% and the specified period of time is from 10 to 200 minutes. Thus, the method of the invention is able to reproduce severe conditions of deposition of material in a few days, so that, in a short period of time, the test fuel can be assessed for tendency to form deposits.

6 Claims, No Drawings

(56) References Cited

OTHER PUBLICATIONS

Written Opinion of PCT/GB2017/051884 dated Nov. 10, 2017 [PCT/ISA/237].
SIDI Engine Fuel Injector Deposit Forming Method; Certified Document; Research Disclosure; ISSN 0374-4353; XP 7141823A; The Industry Standard Disclosed Publication Services; Research Disclosure database No. 584062; pp. 1-2; Published in Dec. 2012 paper journal; published digitally Nov. 21, 2012.
Allen A. Aradi et al.; The Effect of Fuel Composition and Engine Operating Parameters on Injector Deposits in a High-Pressure Direct Injection Gasoline (DIG) Research Engine; SAE Technical Paper Series; XP-002774551; 1999-01-3690; International Fall Fuels & Lubricants; Meeting & Exposition; ISSN 0148-7191; pp. 1-11; Oct. 25-28, 1999.

* cited by examiner

METHOD FOR MAXIMIZING THE FORMATION OF DEPOSITS IN INJECTOR NOZZLES OF GDI ENGINES

CROSS REFERENCE TO RELATED APPLICATIONS

This application is a National Stage of International Application No. PCT/GB2017/051884 filed Jun. 28, 2017, claiming priority based on Brazilian Patent Application No. 10 2016 015228 3, filed Jun. 28, 2016.

FIELD OF THE INVENTION

The present invention relates to fuel injection technologies in engines. More particularly, the present invention relates to technology for direct injection of gasoline in automotive engines.

BACKGROUND OF THE INVENTION

Direct injection of gasoline (GDI—Gasoline Direct Injection) is an advanced injection technology for spark-ignition engines which, owing to the high operating pressures (above 100 bar) and sophisticated strategies for multipoint injection combined with supercharging, allows reduction of engine size, better performance and significant reductions in fuel consumption and atmospheric emissions. This technology has been widely used in automobiles in order to comply with trends for reduction of emissions required by the regulations in various countries and markets.

Recently there have been problems in the field with some models of GDI engines that showed loss of power caused by excessive deposits in the injector nozzles. Investigation showed that the deposits were linked to contamination of gasoline C (gasoline containing ethanol) sold in some specific locations. These problems occurred in GDI engines even though the gasoline was within the ANP specification and no problems had been reported with vehicles with conventional indirect injection (in the admission manifold).

There was therefore a need for a method for assessing the effect of various impurities and/or additives present in the fuel in injector nozzles of GDI engines in the laboratory, and accelerated, so that the results could be obtained and assessed as soon as possible.

After searching the prior art, methodologies were identified for simulating the build-up of deposits in injectors employed in other types of engines. Document FR2981451, for example, discloses a method for simulating the build-up of deposits in an injector of a diesel engine, said simulation being carried out in a diesel engine comprising such an injector. The method consists of determining the physicochemical mechanisms involved in the formation of deposits and selecting at least one operating parameter of the engine and/or of the fluid (fuel) supplied to said engine. Then the formation of deposits in the injector is simulated, controlling the parameters selected for reproducing the physicochemical mechanisms involved in said build-up of deposits.

However, the methodology described in document FR2981451 was developed entirely on the basis of specific parameters and behaviour of the diesel engine and additives in diesel fuel. Thus, that method cannot be applied for injector nozzles of GDI engines.

In the light of the foregoing, it is necessary to develop a specific method for testing the formation of deposits in injector nozzles of GDI engines in the laboratory, to assess the effects of various additives present in the fuel on the formation of these deposits.

As will be explained in more detail below, the present invention aims to solve the problems of the prior art described above in a practical and efficient manner.

SUMMARY OF THE INVENTION

A first aim of the present invention is to provide a method for maximizing the formation of deposits in injector nozzles of GDI engines that is able to reproduce severe conditions of deposition of material in a few days, so that, in a short period of time, the fuel tested can be assessed for its tendency to form deposits.

A second aim of the present invention is to provide a method for maximizing the formation of deposits in injector nozzles of GDI engines that can be carried out completely automatically, without supervision and without interruption.

In order to achieve the aims described above, the present invention provides a method for maximizing the formation of deposits in injector nozzles of GDI engines, said method comprising at least one test cycle, each test cycle comprising at least one testing step in which a predetermined condition of speed and load of the GDI engine is maintained for a specified period of time, wherein in said cycle, in at least one testing step, the engine speed is maintained between 1300 and 3700 rpm, the engine load is maintained between 10 and 80% and the specified period of time is between 10 and 200 minutes.

DETAILED DESCRIPTION OF THE INVENTION

Firstly, it should be pointed out that the following description will be based on preferred embodiments of the invention. As will be obvious to a person skilled in the art, however, the invention is not limited to these particular embodiments.

Since the proposed solution to the problem consisted basically of trying to make the formation of deposits in the injector nozzles as severe as possible, it was necessary to find the main factors that affect the rate of deposition and the amount of material deposited. After conducting various tests, it was observed that for this type of injection system (GDI), high temperatures of the injector nozzles give an increase in the formation of deposits therein. This relation may be observed, for example, by examining the temperature profile in the injector nozzle over time. The temperature profile obtained can be compared, for example, with some measured parameter indicative of the presence of deposition in the injector nozzles. Preferably, the parameter measured is the "Injection Correction Factor", which is directly related to the presence of deposits in the injector nozzles.

The injection correction factor is a parameter of the program of the engine's electronic injection system that adjusts the fuel injection time to maintain the design conditions of the air/fuel mixture, if there is any deviation from the original factory calibration. Injector nozzles partially obstructed with deposits may show loss of flow rate or change in the configuration of the jet, which compromise formation of the mixture and the combustion process. In this case, the engine's electronic injection system recognizes, from monitoring of the exhaust gas by the lambda probe, changes in the quality of the mixture and adjusts the injection time, by altering the value of the injection correction factor.

Therefore a comparison between the profile of fuel flow rate (or variation of the injection correction factor) and the temperature profile during a test was carried out in order to establish a relationship between the rate of deposition of material in the injector nozzles and their temperature.

In addition, it was observed in the tests conducted that the temperature fluctuations during the process are quite an important factor in the process of formation of the deposits. In other words, it was found that temperature fluctuations during the test tended to form a larger amount of deposits in the injector nozzles compared to tests where there was hardly any temperature variation, even though the temperature had been maintained at a relatively high level.

Besides the influence of the temperature of the injector nozzle on the formation of deposits therein, it was found in tests that a high fuel flow rate may make it possible to remove the deposits from the injector nozzle, which is undesirable in the method of the present invention.

That said, with the aim of increasing the severity of formation of deposits in the injector nozzles, a method was defined for maximizing the formation of deposits in injector nozzles of GDI engines, which consists of a test carried out with the engine running, for which operating conditions were selected that provided a high temperature in the injector nozzle with moderate fuel flow rates, by avoiding high engine speed. Conditions of low engine load were also selected with moderate revolutions, besides at least one step with the engine switched off, which generated lower temperatures in the injector nozzle, to take into account the effects of the temperature gradient and low fuel flow rate during the test cycle.

In a preferred embodiment of the present invention, shown in Table 1 below, a test cycle of 10 h duration is carried out, in which preferred values of engine speed and load are established, with operation over a predetermined time interval.

TABLE 1

| Condition | Speed (rpm) | Load (%) | Duration (min) |
|---|---|---|---|
| 1 | 1300 to 1700 | 25 to 35 | 70 to 110 |
| 2 | 1800 to 2200 | 10 to 20 | 160 to 200 |
| 3 | 1300 to 1700 | 70 to 80 | 40 to 80 |
| 4 | 2300 to 2700 | 45 to 55 | 130 to 170 |
| 5 | 3300 to 3700 | 45 to 55 | 70 to 110 |
| 6 | 0 (engine switched off) | 0 (engine switched off) | 10 to 50 |

As can be seen, in a first operating condition that lasts from 70 to 110 min, engine speed between 1300 and 1700 rpm and load between 25 and 35% are envisaged. In a second operating condition that lasts from 160 to 200 min, engine speed between 1800 and 2200 rpm and load between 10 and 20% are envisaged. In a third operating condition that lasts from 40 to 80 min, engine speed between 1300 and 1700 rpm and load between 70 and 80% are envisaged. In a fourth operating condition that lasts from 130 to 170 min, engine speed between 2300 and 2700 rpm and load between 45 and 55% are envisaged. In a fifth operating condition that lasts from 70 to 110 min, engine speed between 3300 and 3700 rpm and load between 45 and 55% are envisaged. Finally, in a sixth operating condition that lasts from 10 to 50 min, the engine is switched off to lower the temperature of the injector nozzles.

Preferably, both the engine speed and the engine load are maintained at a constant value, selected between the maximum and minimum values, for each condition/step during the predetermined time interval. Alternatively, at least one of engine speed and engine load is variable between the maximum and minimum values stipulated for each condition/step during the predetermined time interval.

The variations of engine speed and load over the cycle allow the temperature of the injector nozzles to vary over time in an optimized manner to cause the maximum possible deposition of material, as identified in the initial tests. In addition, high fuel flow rate is prevented, to avoid removal of deposits.

Preferably, the test cycle presented in Table 1 is carried out more than once. Even more preferably, the test cycle presented in Table 1 is carried out 5 to 10 times, totalling approximately 50 to 100 h of testing.

The method of the present invention is preferably carried out completely automatically and without supervision, requiring special programming of a system for automation of the test bench where the GDI engine to be tested is positioned, as well as a series of adjustments to its settings to comply with the technical requirements of the engine (direct injection of fuel with supercharging, for example).

During execution of the test, various parameters of the test bench and of the engine are optionally controlled by the automation system, among them the engine operating conditions, temperature of the admission air, cooling water temperature, temperatures of the oil and fuel. The engine is tested with the original factory calibration.

Optionally, controls and specific limits for variables connected with unsupervised operation are established, so as to provide safe stopping of the test if any operational non-compliance occurs.

Preferably, when carrying out the method of the present invention, the injection correction factor is monitored and recorded for assessing the results of the test for a particular fuel. The injection correction factor, which has a value of 1.0 in normal conditions, has a limit of preferably 1.3, i.e. 30% increase in the fuel flow rate to compensate any deviations of the injection time. Values above 1.3 are considered to be high and the engine could present operational problems due to the deposits in the injector nozzles.

Therefore it is important that the fuel provides a low level of deposits, by keeping the injection correction factor as close to unity as possible, guaranteeing operation in the design conditions, and preserving the original levels of engine performance, consumption and emissions.

Besides monitoring the variable "injection correction factor", the injectors are also preferably assessed with a microscope to examine the level and distribution of the deposits.

Thus, based on the above description, the present invention provides a method for maximizing the formation of deposits in injector nozzles of GDI engines that is able to reproduce severe conditions of deposition of material in a few days, so that, in a short period of time, the test fuel can be assessed for tendency to form deposits.

In addition, the method of the present invention can be carried out completely automatically, without supervision and without interruption throughout the execution of the test cycles.

Numerous variations falling within the scope of protection of the present application are permitted. Thus, it is emphasized that the present invention is not limited to the particular configurations/embodiments described above.

The invention claimed is:

1. Method for maximizing the formation of deposits in injector nozzles of GDI engines, characterized in that it comprises at least one test cycle, each test cycle comprising plurality of testing steps in which a predetermined condition of speed and load of the GDI engine is maintained for a specified period of time, wherein, in each said at least one test cycle, the plurality of testing steps includes the following steps which are performed sequentially:

engine speed is maintained between 1300 to 1700 rpm and engine load is at 25 to 35% for 70 to 110 minutes;

the engine speed is maintained between 1800 to 2200 rpm and engine load is at 10 to 20% for 160 to 200 minutes;

the engine speed is maintained between 1300 to 1700 rpm and engine load is at 70 to 80% for 40 to 80 minutes;

the engine speed is maintained between 2300 to 2700 rpm and engine load is at 45 to 55% for 130 to 170 minutes;

the engine speed is maintained between 3300 to 3700 rpm and engine load is at 45 to 55% for 70 to 110 minutes; and the engine is switched off for 10 to 50 minutes to lower temperature of the injector nozzles.

2. Method according to claim 1, characterized in that the engine speed and load are maintained at a constant value, selected between the maximum and minimum values, for each testing step, for the respective specified period of time.

3. Method according to claim 1, characterized in that at least one of engine speed and load is variable between the maximum and minimum values stipulated for each condition/step for the respective specified period of time.

4. Method according to claim 1, characterized in that each test cycle is repeated 5 to 10 times.

5. Method according to claim 1, characterized in that it is carried out automatically and unsupervised by a system of automation.

6. Method according to claim 5, characterized in that the system of automation controls, during execution of the method, at least one of: the engine operating conditions, temperature of the admission air, cooling water temperature, oil temperature and fuel temperature.

\* \* \* \* \*